US005810525A

United States Patent [19]

Ector, Sr.

[11] Patent Number: 5,810,525

[45] Date of Patent: Sep. 22, 1998

[54] TOOL AND BIT BAND FOR DRILLS

[76] Inventor: Tommie L. Ector, Sr., 4 E. Rochelle St., Cincinnati, Ohio 45219-2032

[21] Appl. No.: 862,693

[22] Filed: May 23, 1997

Related U.S. Application Data

[60] Provisional application No. 60/019,345 Jun. 7, 1996.

[51] Int. Cl.[6] .................. B23B 39/00

[52] U.S. Cl. .................. 408/241 R; 408/124; 81/177.4; 81/490; 206/362; 206/363; 269/16

[58] Field of Search .................. 408/241 R, 124; 206/362, 363; 81/10, 427.5, 64, 177.4, 462, 490; 269/16, 909, 290

[56] References Cited

U.S. PATENT DOCUMENTS

| | | | |
|---|---|---|---|
| D. 342,660 | 12/1993 | Chapin . | |
| 4,098,506 | 7/1978 | Gaiser . | |
| 4,269,314 | 5/1981 | Barrash . | |
| 4,385,692 | 5/1983 | Eldridge, Jr. | 206/363 |
| 4,508,221 | 4/1985 | Olson | 408/239 R |
| 4,797,040 | 1/1989 | Hibbard | 408/241 R |
| 4,825,475 | 5/1989 | Smart . | |
| 4,932,294 | 6/1990 | Chang | 408/241 R |
| 4,973,205 | 11/1990 | Spaulding | 408/241 R |
| 5,056,661 | 10/1991 | Balzano | 408/241 R |
| 5,174,178 | 12/1992 | Disston, Jr. | 30/490 |
| 5,269,410 | 12/1993 | Abregano . | |
| 5,369,819 | 12/1994 | Capuano, Jr. . | |
| 5,445,479 | 8/1995 | Hillinger | 408/241 R |
| 5,459,905 | 10/1995 | Voyre . | |
| 5,499,562 | 3/1996 | Feng | 81/490 |
| 5,704,260 | 1/1998 | Huang | 81/490 |

FOREIGN PATENT DOCUMENTS

| | | | |
|---|---|---|---|
| 1394253 | 2/1965 | France . | |
| 2455553 | 11/1980 | France . | |
| 2589095 | 4/1987 | France | 408/241 R |

*Primary Examiner*—Daniel W. Howell
*Assistant Examiner*—Adesh Bhargava
*Attorney, Agent, or Firm*—Richard C. Litman

[57] ABSTRACT

A tool holding assembly for placement around a handle portion and/or a body portion of a portable hand drill. The assembly includes a first elastic sleeve and a second elastic sleeve which are adapted for placement over the handle portion of the drill. The second sleeve partially overlaps the first sleeve, thereby providing additional tension to retain drill bits and other tools against the handle portion of the drill. The assembly may also include a third elastic sleeve which is adapted for placement over the body portion of the drill, and which is particularly disposed for retaining an elongate shank of a drill bit or the like. Together the various sleeves allow drill accessories such as drill bits, drill gimlets, and related tools to be retained upon the drill by tension of the elastic sleeves against the drill. The elastic sleeves are formed of any resilient material, however, rubber is preferred.

10 Claims, 6 Drawing Sheets

TOOL AND BIT BAND FOR DRILLS

CROSS-REFERENCE TO RELATED APPLICATION

This application claims the benefit of U.S. Provisional patent application Ser. No. 60/019,345, filed Jun. 7, 1996.

BACKGROUND OF THE INVENTION

1. Field of the Invention

The present invention relates to an elastic sleeve assembly for placement around portions of a portable hand drill, for holding different drill bits, drill gimlets, tool bits, sockets, a chuck key and related tools. The invention provides the drill user with convenience and assurance to have the right bit at his fingertips.

2. Description of Prior Art

Various devices, such as tool boxes, belt pouches and the like, have been used to hold tools required for operating portable hand-held drills. Cordless or power cord hand drills are extensively used by electricians, plumbers, cabinet installers and others. However, no readily available carrying device is available in the marketplace to hold the drill bits, drill gimlets and related tools required by hand drill operators.

The cost of new construction has been rising steadily during the most recent decades. This increase is due to both the costs of material and labor. In the technically advance present era, skilled laborers, such as carpenters, electricians, masons, drywall hangers and finishers, etc., are decreasing in numbers. The resulting shortage has caused the cost of labor to soar. Applicant has found a need to at least minimize the time required to accomplish a given task by providing a device useful for storing and maintaining accessible various drill bits, drill gimlets and related tools which a drill operator may need.

The prior art is exemplified by the following patents: U.S. Design Pat. No. 342,660, issued on Dec. 28, 1993 to David S. Chapin, illustrates an ornamental design for a screwdriver handle sleeve. Chapin does not show an elastic sleeve assembly that fits around the handle portion of a portable hand drill.

U.S. Pat. No. 4,098,506, issued on Jul. 4, 1973 to Conrad J. Gaiser, provides a removable hand grip for a tennis racket. Gaiser does not disclose an elastic sleeve for placement around the grip handle portion of a portable hand drill of the present invention.

U.S. Pat. No. 4,269,314, issued on May 26, 1981 to Marshall J. Barrash, describes a combined elastic endless band and integral handle strap for maintaining groups of cylindrical beverage cans. Barrash does not disclose an elastic sleeve assembly for placement around the handle portion of a portable hand drill and for holding drill bits and miscellaneous tools, as provided by the present invention.

U.S. Pat. No. 4,825,475, issued on May 2, 1989 to Keith M. Smart, describes a removable cuff for the lower end of a pant leg. Smart does not disclose an elastic sleeve assembly associated with a portable hand drill of the present invention.

U.S.Pat. No. 5,269,410, issued on Dec. 14, 1993 to Jeffery M. Abregano, describes a golf accessory organizer that can be removably attached to a top cuff of a golf bag. Abregano does not disclose an elastic sleeve assembly for placement around the handle portion of a portable hand drill.

U.S. Pat. No. 5,369,819, issued on Dec. 6, 1994 to Earl Capuano, Jr., describes an elastic band for encircling a water tank so that a toilet seat and seat cover may be optionally retained in the raised position. Capuano does not disclose an elastic sleeve assembly for placement around the handle portion of a portable hand drill and for holding drill bits and miscellaneous tools.

U.S. Pat. No. 5,459,905, issued on Oct. 24, 1995 to Guy Voyre, describes two rubber bands or portions of a single band held together by two metal clamps. Voyre does not disclose an elastic sleeve assembly for placement around the grip handle portion of a portable hand drill.

French Patent Document No. 1,394,253, dated Feb. 22, 1965, describes a hook and loop fastened strap engaging belt loops or hooks attached to the inside of a wearer's pant leg. The strap of the French Document '253 is intended to gather the opening of the pant leg around the ankle of the wearer. The French Document '253 does not disclose an elastic sleeve assembly for placement around the handle portion of a portable hand drill.

French Patent Document Number 2,455,553, dated Nov. 28, 1980, provides a clamping device for holding a package of booklets. The French Document '553 does not disclose an elastic sleeve assembly for placement around the grip handle portion of a portable hand drill and for holding drill bits and related tools.

None of the above inventions and patents, taken either singly or in combination, is seen to describe the instant invention as claimed.

SUMMARY OF THE INVENTION

Applicant has designed an accessory for a common construction tool, namely a hand held power drill. This accessory is a welcomed time saver, because it minimizes the amount of time spent locating and changing drill bits. Applicant has found a unique and novel way of finding drill bits quickly and easily. By recycling used inner tubes, i.e., from bicycles, wheelbarrows, etc., applicant provides resilient endless bands for supporting drill bits on drills. Thus, maintaining the drill bits in contact with the drill reduces the time necessary for finding the right bit.

The present invention is an elastic sleeve assembly for placement around the grip handle portion and/or body portion of a portable hand drill, either cordless or powered. Drill bits, drill gimlets, chuck keys, and related tools (having a shank extending therefrom) are inserted under the elastic sleeve assembly and held therein by tension of the elasticity of the sleeve assembly. In addition, the present invention provides an elastic sleeve around the drill body for supporting additional elongated shank drill bits, drill gimlets, chuck keys, and related tools. The elastic sleeve assembly allows an user to have a variety of drill bits, drill gimlets and related tools at his/her disposal.

Accordingly, it is a principal object of the invention to provide an elastic sleeve assembly that fits around a portable drill, cordless or powered, and that holds drill bits, drill gimlets and the like in place by the tension of the sleeve assembly on the drill handle and/or body.

It is another object of the invention to provide a tool carrier assembly in which a variety of drill related tools can be neatly organized therein to allow quick access thereto.

It is a further object of the invention to provide a tool holding assembly for carrying a variety of drill bits, drill gimlets, tool bits, hand tools, sockets, a chuck key and the like.

Still another object of the invention is to provide an elastic endless binding device for holding drill bits and miscellaneous tools.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

In its broadest aspect the present invention is an elastic tool holding assembly for placement around the grip handle portion of a portable hand drill, cordless or powered. Drill bits and related tools are inserted under the elastic assembly and held in place by the tension caused by the elastic assembly on the drill handle. The elastic sleeve assembly allows a user to have a variety of drill bits and related tools at his/her finger-tip disposal at the drill site.

Figure 1:
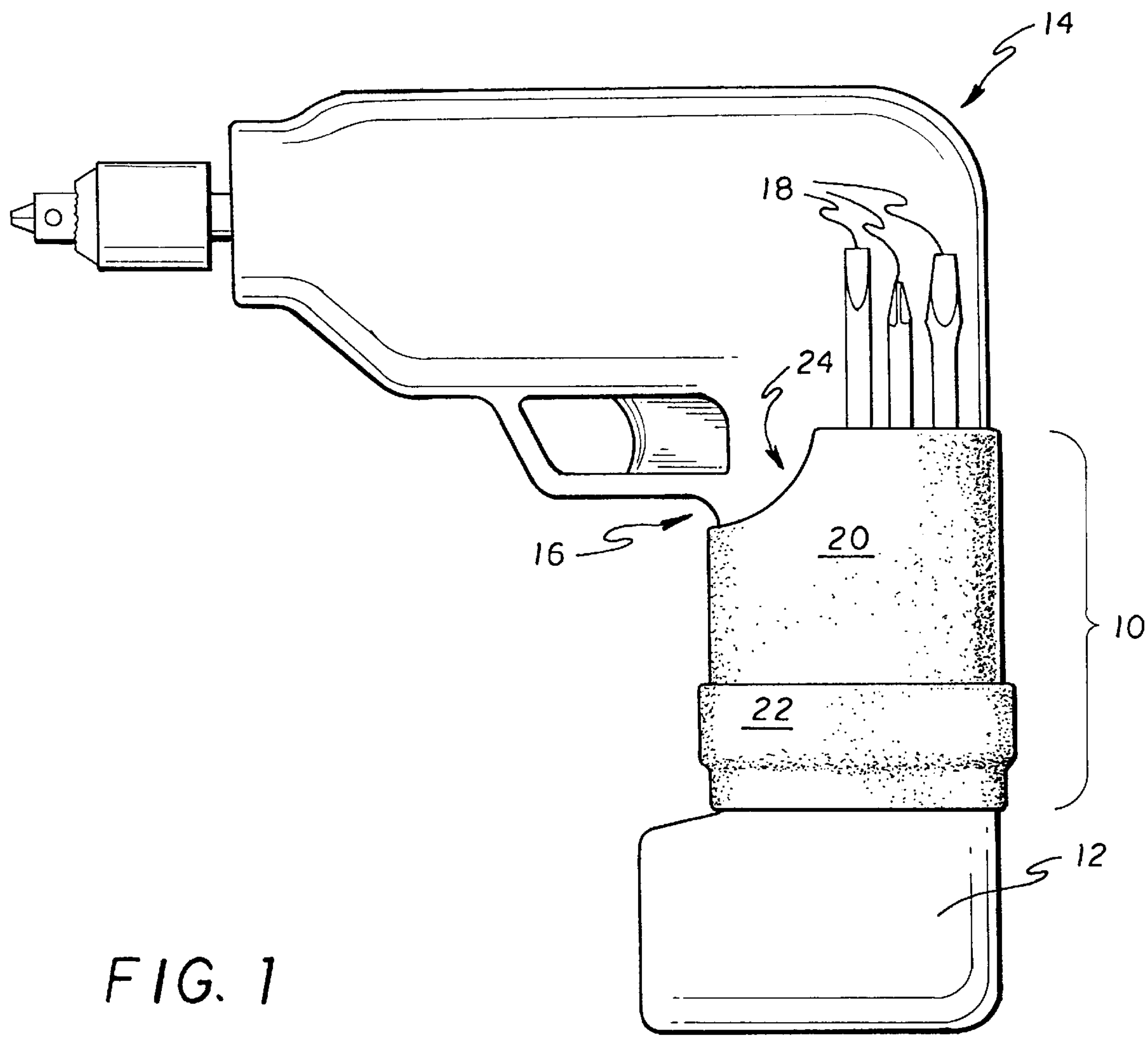
FIG. 1 is a left side view of a first embodiment of the elastic sleeve assembly for a cordless portable hand drill, showing tools (i.e., two flathead and one Phillips head screwdriver bits) retained beneath the sleeve assembly.

Referring to FIG. 1, there is illustrated a first embodiment of the present invention, namely, an elastic sleeve assembly 10 for fitting around an elongated handle portion 12 of a portable hand drill 14 of the type having a trigger guard unit 16. The elastic sleeve assembly is useful for holding and storing various tools such as screwdriver bits 18 or the like in place by the tension of the elastic sleeve assembly 10 on the handle portion 12. The elastic sleeve assembly 10 includes a first endless elastic sleeve 20 and a second endless elastic sleeve 22. The first and second sleeves 20, 22 are formed of a resilient substance; however, rubber is the preferred material because of its inherent resiliency, tensioning, and 'grabbing' ability (i.e., frictional and adhesive properties).

The first sleeve 20 is substantially cylindrical in configuration in its normal state, having a predetermined diameter and length. The length is referred to as the distance from one end of the sleeve to the other end of the sleeve. The length of the first sleeve 20 needs to be sufficiently long to retain a significant portion of a bit 18 or the like, otherwise the bit will tend to slip and rotate with respect to the drill 14. A length of the first sleeve 10 greater than one inch is desirable, and a length approaching about two inches is preferred. The first sleeve 20 is dimensioned and configured to sufficiently fit over the handle portion 12 and to hold the screwdrivers 18 therein.

The second sleeve 22 also is substantially cylindrical in configuration in its normal state, having a predetermined diameter and length. The second sleeve 22 is adapted and configured to be positioned on the drill handle such that it overlaps a small portion of the first sleeve 20. The second sleeve 22 is for the purpose of holding the bottom portions of the screwdriver bits 18 tightly within the elastic sleeve assembly 10. In other words, the first sleeve 20 may be sufficient to hold the body portions or the whole length of the screwdriver bits 18 in tension against the wall of the handle portion 12. The second sleeve 22 holds the bottom or end portions of the screwdriver bits 18 in tension against the wall of the handle portion 12.

Figure 2:
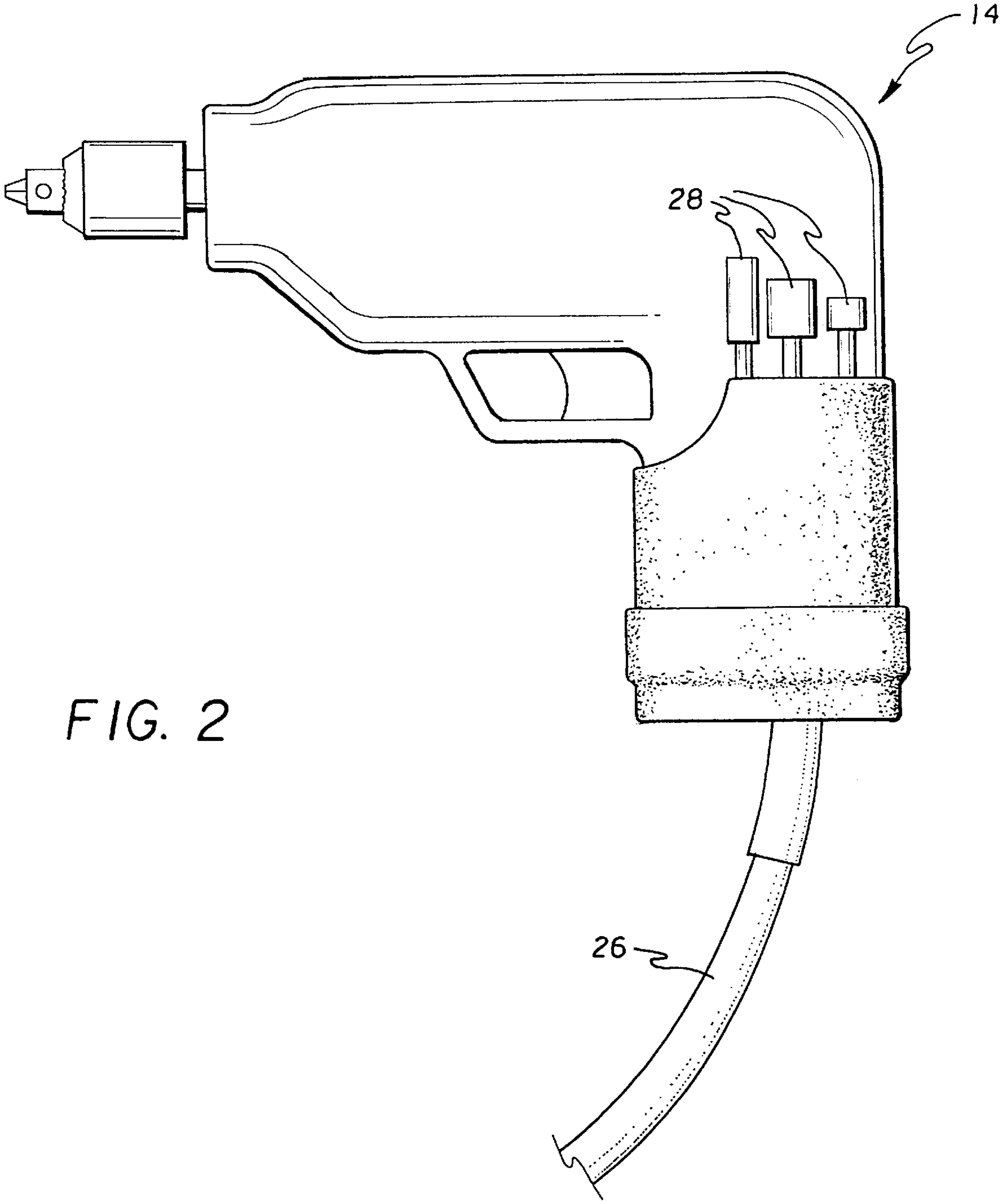
FIG. 2 is a left side view of the first embodiment of the elastic sleeve assembly for an electric hand drill having an electric power cord, showing socket driver bits retained beneath the sleeve assembly.

The first sleeve 20 has substantially the same diameter as the second sleeve 22 since both the first and second sleeves 20, 22 are adapted to fit over the same handle portion 12. The first sleeve 20, however, has a length larger than or equal to the length of the second sleeve 22. In addition, the first sleeve 20 may have a cutout or slit forming a V-shaped notch 24 when expanded. The notch is located at the top edge of the first sleeve 20 so that the first sleeve will not interfere with the trigger guard unit 16 of the hand drill 14. FIG. 2 shows usage of the same sleeve assembly 10 on a hand drill 14 of the type having an electrical cord 26. The tools shown here are socket driver bits 28, although screwdriver bits 18 or other like bits may be similarly retained by the sleeve assembly 10.

Figure 3:
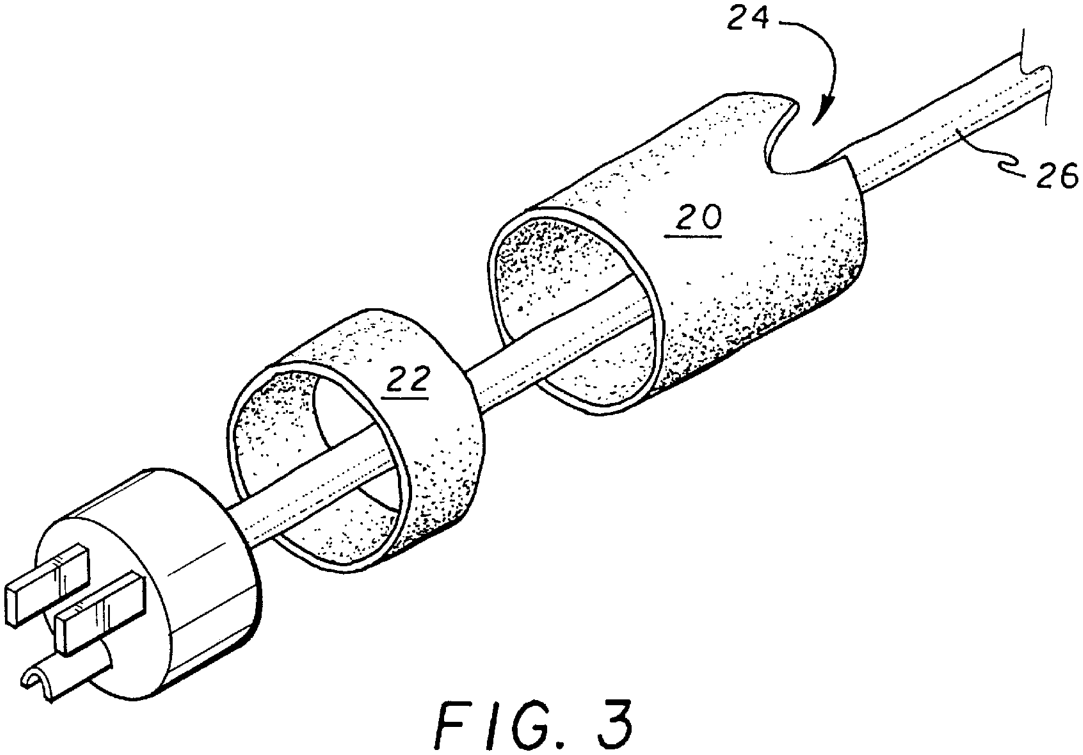
FIG. 3 is a perspective view of the inner sleeve and outer sleeve portions of the sleeve assembly of FIG. 2 being installed upon the electric hand drill by passing the sleeve assembly along the electrical power cord.

In a practical application of the present invention, the elastic sleeve assembly 10 may consist of a pair of two inch diameter tubular sleeves (in a relaxed or normal state). The larger or first sleeve 20 has a length of about two inches and the smaller or second sleeve 22 has a length of about one-inch. As seen in FIG. 3, the first sleeve 20 is initially passed over an electrical cord 26 and then the second sleeve 22 also is passed over the electrical cord 26. Finally, the sleeves 20, 22 are stretched and slipped or rolled up the handle portion 12 of the hand drill 14. The second sleeve 22 overlaps the first sleeve 20 by approximately a half-inch. The hand drill 14 may use conventional tools as hex head drill bits, slot heads, Phillips head drivers and the like. Such tools are slipped under the rubber sleeves 20, 22 where such tools are placed under tension caused by the elasticity of the rubber against the wall of the handle portion 12. The instant invention may be designed as an accessory for a three-eighths-inch cordless or a II-VA power drill. Of course, the invention may also be employed to hold the chuck key of the power tool, particularly in the case of a cordless power drill; many corded power drills have an attachment for holding the chuck key on the power cord. Even in the case of corded drills so equipped, however, it may be more convenient to have the chuck key held by the present invention.

Figure 4:
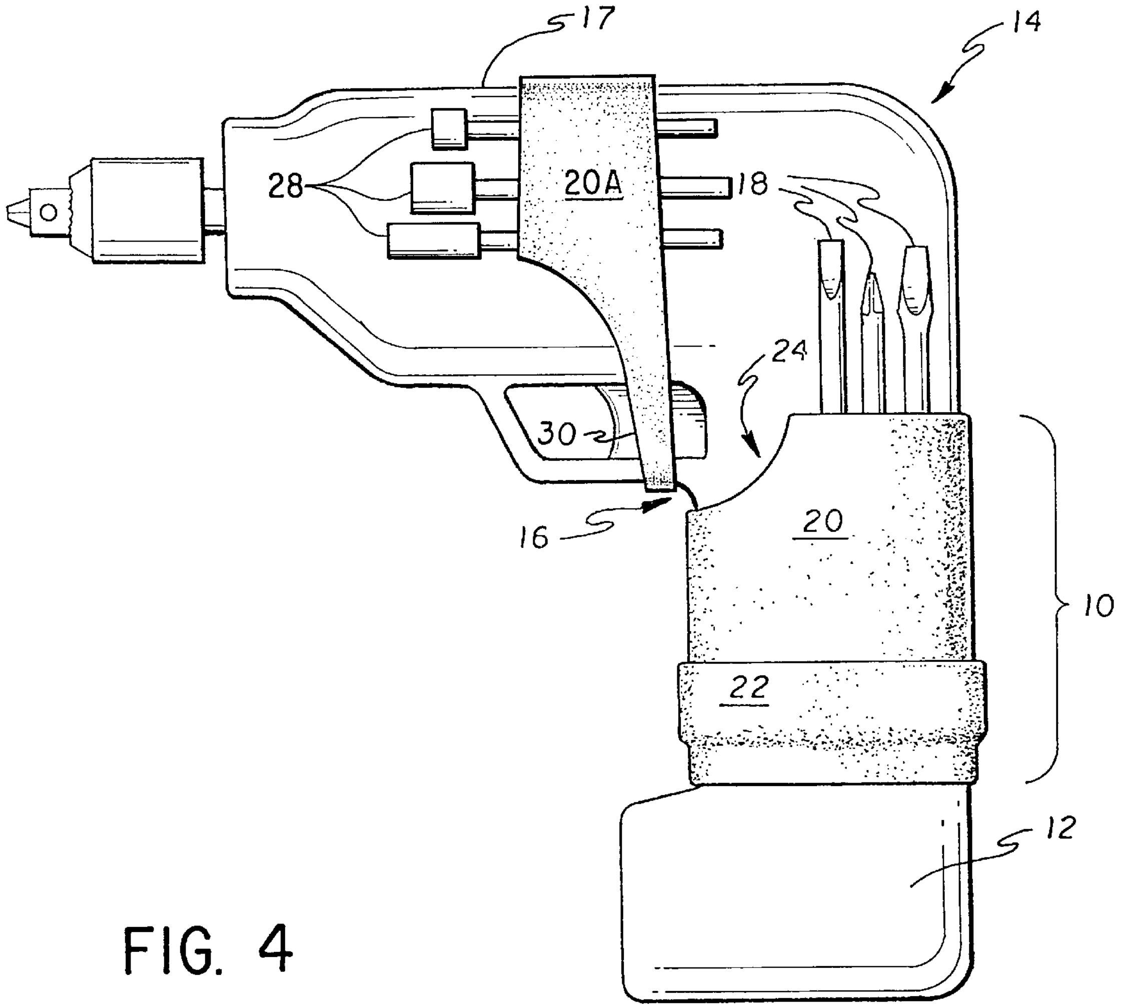
FIG. 4 is a left side view of the first embodiment and a second embodiment of the elastic sleeve assembly for the cordless power drill, showing tools (i.e., two flathead and one Phillips head screwdriver bits) retained beneath the sleeve assembly on the handle of the drill and a number of socket driver bits retained beneath the sleeve assembly on the drill body.
Figure 5:
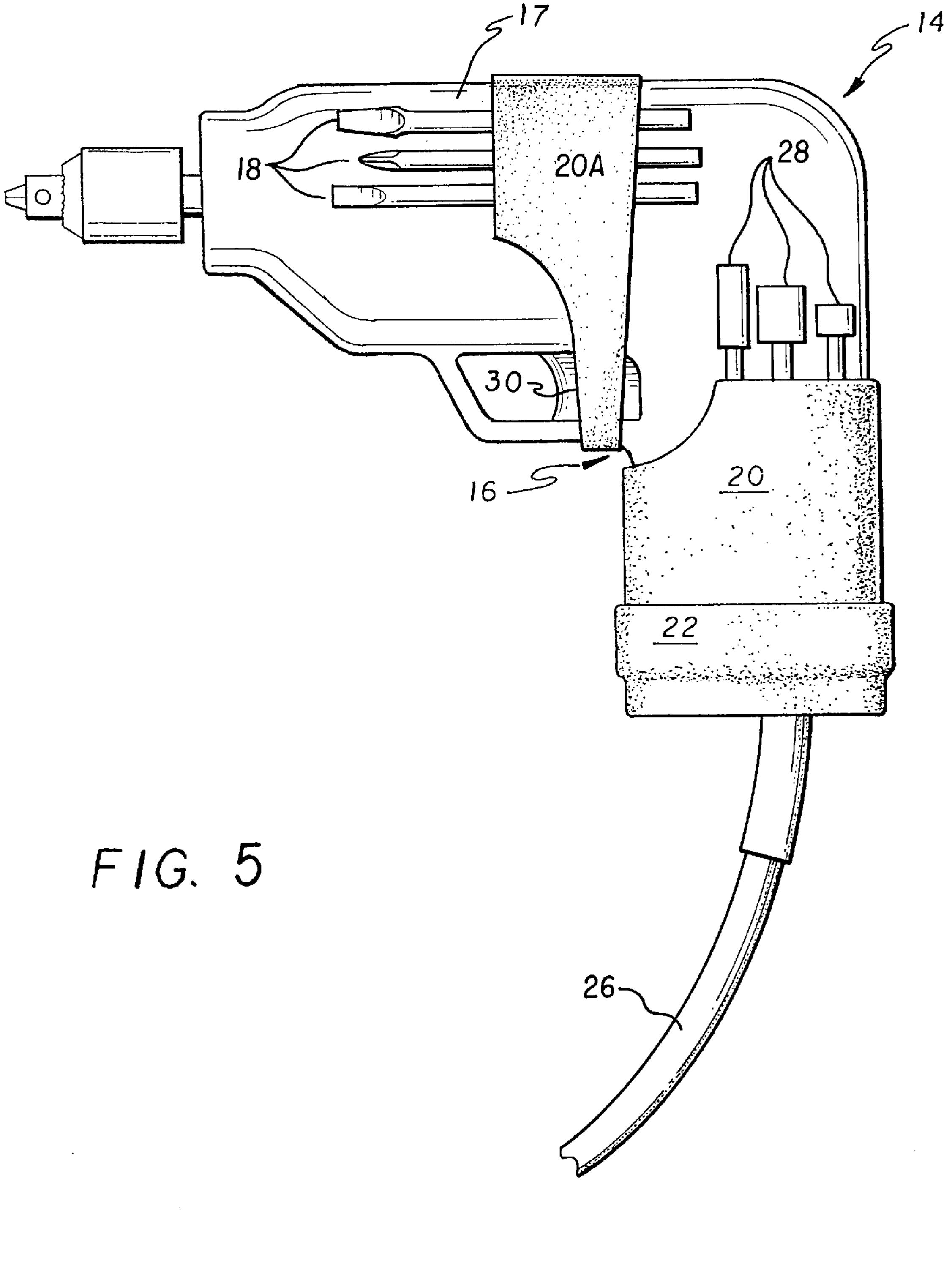
FIG. 5 is a left side view of the first and second embodiments of the elastic sleeve assembly for the portable hand drill having an electrical power cord, showing socket driver bits retained beneath the sleeve assembly on the handle, and tools (i.e., two flathead and one Phillips head screwdriver bits) retained beneath the sleeve assembly on the drill body.

Referring now to FIGS. 4 and 5, in addition to the use of the first and second sleeves 20, 22 on the handle portion 12 of the drill 14, a third sleeve 20A and a fourth sleeve 22A may also be provided for storage of additional drill bits. The third sleeve is adapted and configured to be placed over a body portion 17 of the drill 14. The third sleeve 20A (note FIGS. 4 and 5) has a diameter of approximately two inches, however, the length varies about its circumference in order to accommodate the trigger guard unit 16 of the drill 14. Thus, the third sleeve 20A may include a tapered side 30, whose length is substantially smaller than the overall length of sleeve 20A. On the other hand, the third sleeve 20A fits around the body portion 17 of the drill 14, and fourth sleeve 22A also fits around the body portion 17 of drill 14 overlapping the third sleeve 20A. The third sleeve 20A and the fourth sleeve 22A cooperate in the same manner as the first sleeve 20 and the second sleeve 22. The third sleeve 20A and the fourth sleeve 22A support drill bits, drill gimlets, and other tools having elongated shank portions, thereby providing additional support for a multiplicity of various length and sized accessories for use with the drill 14.

Figure 6:
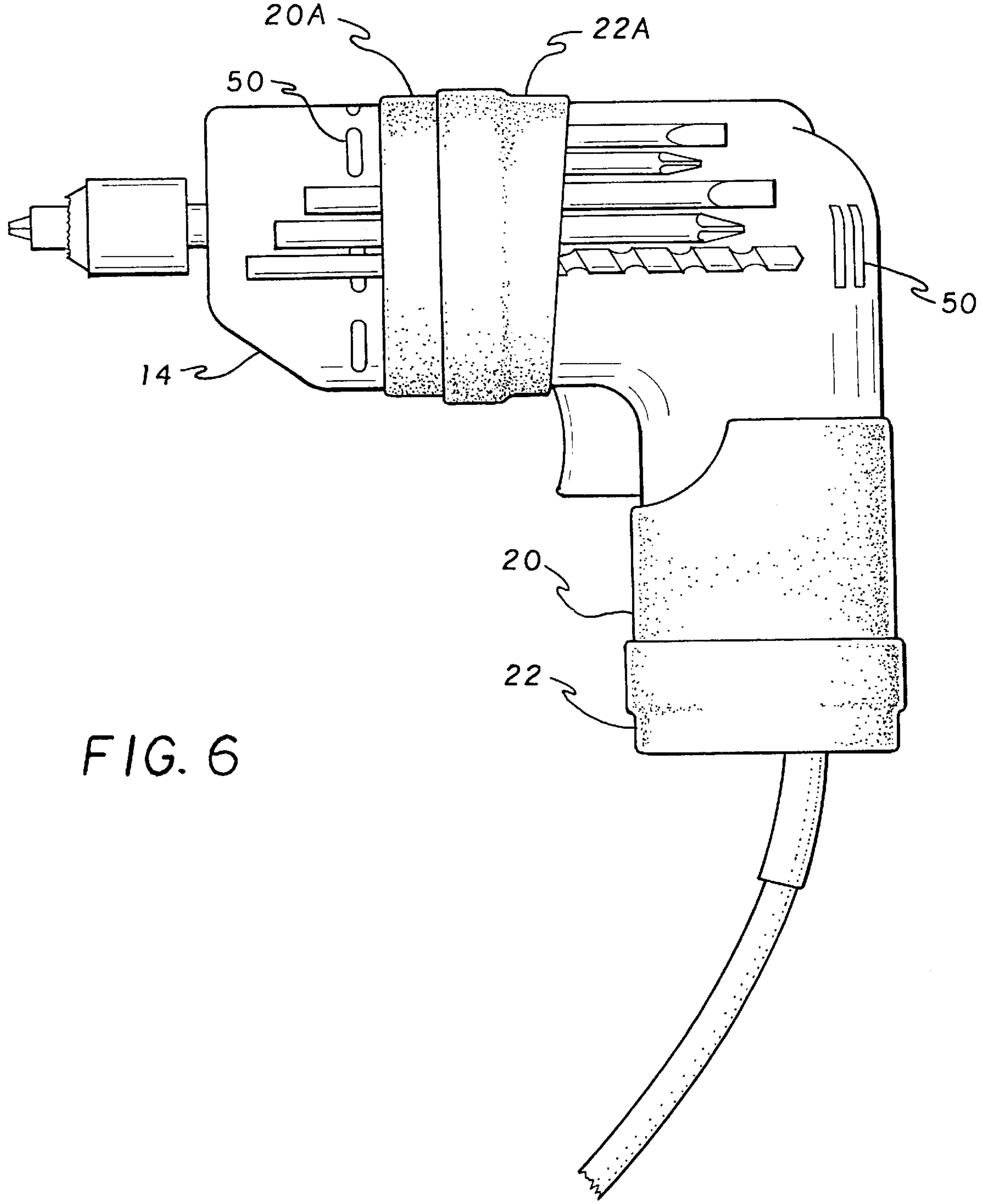
FIG. 6 is a left side view of a further embodiment of the elastic sleeve assemblies, showing tools having longer and shorter shanks supported thereon.

The third sleeve 20A encircles the trigger guard unit 16 without inhibiting access to the drill trigger. Further, the third sleeve 20A is also configured so as to allow the ventilation holes of the drill body 14 to remain totally in communication with the atmosphere. Alternatively, as seen in FIG. 6, the sleeve 20A encircles only the body portion 17 of drill 14. In addition, another 22A encircles the body portion 17 of drill 14, and overlaps an edge of the third sleeve 20A at a position that provides adequate spacing for ventilation slots 50.

It is to be understood that the present invention is not limited to the embodiments described above, but encompasses any and all embodiments within the scope of the following claims.

I claim:

1. An elastic tool holding assembly for fitting about a portable hand drill of the type having a trigger guard and a handle portion, an elastic sleeve assembly being disposed for holding drill gimlets and related tools in place by the tension of the elastic sleeve assembly against the drill, the tool holding assembly comprising:

a first elastic sleeve member having a predetermined diameter and a predetermined length, said first sleeve member also having a notch formed at one end thereof, said first sleeve member being dimensioned and configured for fitting over the handle portion of the hand drill with said notch thereon registering with the trigger guard of the hand drill; and a second elastic sleeve member having a predetermined diameter and a predetermined length, said diameter of said second sleeve being substantially the same as said diameter of said first sleeve, and said length of said second sleeve being less than or equal to the length of said first sleeve, said second sleeve member being dimensioned and configured for fitting over the grip handle portion in a partial overlapping relationship with said first sleeve.

2. The elastic sleeve assembly according to claim 1, wherein said first and second sleeve members are made of rubber.

3. The elastic sleeve assembly according to claim 2, wherein said first sleeve member and said second sleeve member are endless sleeves.

4. The elastic sleeve assembly according to claim 1, wherein said notch of said first sleeve member has a V-configuration when said first sleeve is expanded.

5. An elastic tool holding assembly for fitting about a portable hand drill of the type having a body portion, a trigger guard and a handle portion, an elastic sleeve assembly being disposed for holding drill gimlets and related tools in place by the tension of the elastic sleeve assembly against the hand drill, the elastic sleeve assembly comprising:

a first elastic sleeve member having a predetermined diameter and a predetermined length, said first sleeve member also having a notch formed at one end thereof, said first sleeve member being dimensioned and configured for fitting over the handle portion of the hand drill with said notch thereon registering with the trigger guard of the hand drill;

a second elastic sleeve member having a predetermined diameter and a predetermined length, said diameter of said second sleeve being substantially the same as said diameter of said first sleeve, and said length of said second sleeve being less than or equal to the length of said first sleeve, said second sleeve member being dimensioned and configured for fitting over the handle portion in a partial overlapping relationship with said first sleeve; and a third elastic sleeve member having a having a predetermined diameter and a predetermined length, said third sleeve member being dimensioned and configured for fitting over the body portion of the portable hand drill device to hold and support drill gimlets and related tools of the type having elongated shanks.

6. The elastic sleeve assembly according to claim 5, wherein said first, second, and third sleeve members are made of rubber.

7. The elastic sleeve assembly according to claim 6, wherein said first, second, and third sleeve members are endless sleeves.

8. An elastic tool holding assembly for fitting about a portable hand drill of the type having a body portion, a trigger guard and a handle portion, an elastic sleeve assembly being disposed for holding drill gimlets and related tools in place by the tension of the elastic sleeve assembly against the hand drill, the elastic sleeve assembly comprising:

a first elastic sleeve member having a predetermined diameter and a predetermined length, said first sleeve member also having a notch formed at one end thereof, said first sleeve member being dimensioned and configured for fitting over the handle portion of the hand drill with said notch thereon registering with the trigger guard of the hand drill;

a second elastic sleeve member having a predetermined diameter and a predetermined length, said diameter of said second sleeve being substantially the same as said diameter of said first sleeve, and said length of said second sleeve being less than or equal to the length of said first sleeve, said second sleeve member being dimensioned and configured for fitting over the handle portion in a partial overlapping relationship with said first sleeve;

a third elastic sleeve member having a having a predetermined diameter and a predetermined length, said third sleeve member being dimensioned and configured for fitting over the body portion of the portable hand drill device to hold and support drill gimlets and related tools of the type having elongated shanks; and a fourth elastic sleeve member having a predetermined diameter and a predetermined length, said diameter of said fourth elastic sleeve being substantially the same as said diameter of said third sleeve, and said length of said fourth elastic sleeve being less than or equal to the length of said third elastic sleeve, said fourth elastic sleeve member being dimensioned and configured for fitting over the body portion in a partial overlapping relationship with said third sleeve; thereby cooperating with said third sleeve for securely holding and supporting drill gimlets and related tools of the type having elongated shanks along the drill body.

9. The elastic sleeve assembly according to claim 8, wherein said first, second, third, and fourth sleeve members are made of rubber.

10. The elastic sleeve assembly according to claim 9, wherein said first, second, third, and fourth sleeve members are endless sleeves.

* * * * *